Jan. 2, 1945.  B. C. McFADDEN  2,366,344

EXTRUSION

Filed Oct. 21, 1940

INVENTOR
Benjamin C. McFadden
BY
S. Ernest Low.
ATTORNEY

Patented Jan. 2, 1945

2,366,344

UNITED STATES PATENT OFFICE 2,366,344

EXTRUSION

Benjamin C. McFadden, Pittsburgh, Pa., assignor to Aluminum Company of America, Pittsburgh, Pa., a corporation of Pennsylvania Application October 21, 1940, Serial No. 362,047

5 Claims. (Cl. 207—17)

The present invention relates in general to improvements in the art of extrusion. It is particularly directed to improvements in extrusion die or tool structures for the production of extruded shapes or sections from unperforated billets or metal charges.

Extrusion dies or tools, generally known as "porthole" type dies, are experiencing increasing success and acceptance in the extrusion art as the development of this art is presently considered. Such porthole die assemblies or structures normally comprise a front male or mandrel die and a back female or exterior contour-controlling die, so arranged in assembled relationship that the metal of an unperforated billet, or solid metal charge, divides itself under the influence of pressure into one or more streams of metal which flow through the front die and around the mandrel where it coalesces in a mixing or welding chamber adjacent the entrance to a die aperture in the back die. Continued extrusion pressure causes the metal to be forced out of the mixing or welding chamber and to be extruded through a die orifice, which is defined between the aperture in the female die and the mandrel. It will be appreciated that extrusion die assemblies of this general type have eliminated the necessity of using perforated or hollow metal billets in the production of tubular shapes by an extrusion process, and for this reason porthole type die assemblies have found ready acceptance in the extrusion art.

Regardless of the fact that porthole type extrusion die assemblies have experienced favorable acceptance in the extrusion art, these dies have certain inherent structural limitations which contribute largely to the development of excessive pressures during their use, which pressures often result in considerable die breakage with attendant high operating maintenance. The pressures experienced differ for different metals and alloys being extruded, and are particularly noticeable at the beginning of an extrusion operation, as distinguished from the pressures developed after the metal of a billet has commenced to flow under the continued applied extrusion force. It would probably be inaccurate to attempt to explain all of the factors contributing to the excessive pressures that are developed during an extrusion operation through a porthole type extrusion die assembly, but it can be definitely stated that the intensities of the developed pressures bear a definite relationship to the ratio of the perimeter of an extruded shape or section to its metal volume; to non-symmetry of configuration of the extruded shape; and to the general design of the porthole extrusion dies, including the cross-sectional area and shape of the metal-flow passages through the front die, or male member, of a porthole type extrusion die. Of these variables, the latter is usually the only factor over which a tool designer or operator has any control for any given extruded shape or section.

Investigation of commercially known types of porthole extrusion dies has shown that these dies in general can only be employed in extrusion operations where the extrusion pressures adjacent the dies are maintained at substantially 100,000 pounds per square inch, or under. In fact, maximum pressure of 100,000 pounds per square inch has only been possible following prolonged experience in tool design, with particular significance being attached to the selection and disposition of the metal-flow passages through the front or male die to minimize losses resulting from frictional resistance, and to reduce to a minimum abrupt changes in direction of flow of the metal through such dies.

Even in their present state of development, porthole extrusion die assemblies constructed from available metals and alloys exhibit an inherent tendency to bend under the influence of the pressures experienced in extrusion practice. This, in part, is caused by the fact that it has always been considered desirable to maintain the front or male die member at a minimum thickness in order that frictional resistance to metal flowing through the ports or metal-flow passages would be reduced to a minimum. This feature of design manifestly reduces the available sectional modulus of the front die in resistance to bending, and as a result of this condition, use of such porthole dies is known to often result in the production of commercially unacceptable extruded products. For example, uncontrollable bending of the front die member, which in reality is composed of a plurality of bridge members supporting a mandrel, causes the mandrel to shift out of proper alignment with its complementary female die aperture, with the result that a non-uniform extruded product is produced. In the case of circular tubing, this would result in the production of commercially unacceptable eccentric tubing. Excessive bending also causes permanent deformation of the male die member with numerous detrimental results from its continued use. In extreme cases of bending, the front die is fractured and must be replaced.

It has been found that porthole extrusion dies incorporating all of the advantages of presently used dies of this type can be greatly improved by constructing the front or male die member in the form of a laminated structure wherein materials exhibiting different physical characteristics can be employed to greatly alleviate, and in some instances completely eliminate, the disadvantages arising out of bending stresses. In this connection, it has been discovered that a materially stronger and more ductile bridge construction can be developed in a male die member by proper selection of the materials of the various laminae entering into the die structure. It is further possible to selectively treat the various laminae of the die structure, whether the laminae are constructed from the same or dissimilar materials, to develop their maximum strength and ductility without influencing the material or heat-treatment of the mandrel, or the material of the die in its entirety. In this manner creep, heat transfer, and other factors entering into the die structure, may be carefully controlled.

It is an object of the present invention to provide a porthole type of die assembly which has all of the advantages of present dies of this general class, but which also incorporates improved and superior features of construction.

A further object of the invention is to provide a porthole extrusion die of sturdy and rigid construction which incorporates metals or metal alloys disposed in selective relationship to their physical characteristics in such a manner that stressed conditions in the die structure are adequately provided for.

Another object of the invention is to provide a porthole extrusion die assembly of laminar construction which facilitates varying degrees and types of heat-treatment of the various parts of the die assembly with minimum residual hardening strains.

A further object of the invention is to provide a porthole extrusion die assembly of laminar construction which provides for interchangeability and substitution of one or more of the parts of the die structure as may be required.

Other objects and advantages of the invention will be apparent on consideration of the following description of a specific embodiment of the present invention when taken in conjunction with the drawing forming a part hereof, in which.

Figure 1:
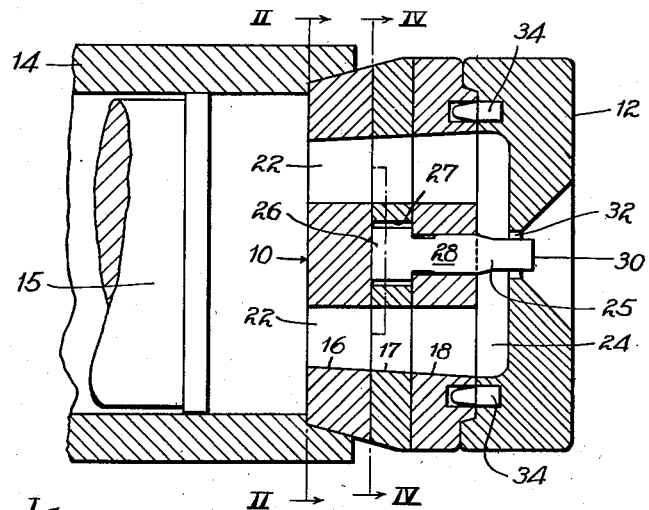
Fig. 1 represents a sectional elevation taken along the line I—I of Fig. 2, and disclosing an extrusion die assembly incorporating the novel features of the present invention in association with fragmentary portions of a cooperating extrusion billet cylinder and ram.
Figure 2:
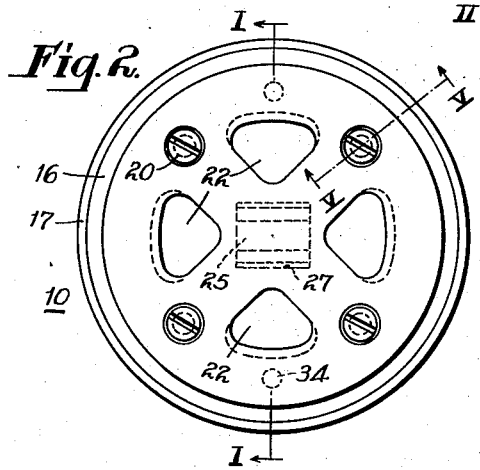
Fig. 2 represents an end elevation of the front die as viewed in the direction of the arrows II—II in Fig. 1.
Figure 3:
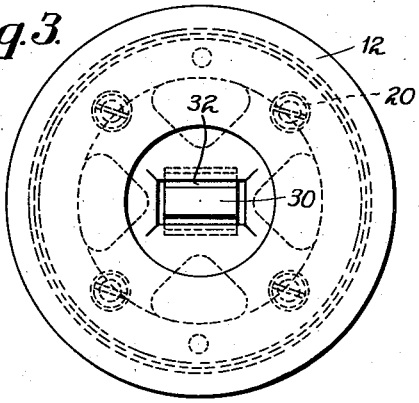
Fig. 3 represents an end elevation as viewed from the right of Fig. 1.
Figure 4:
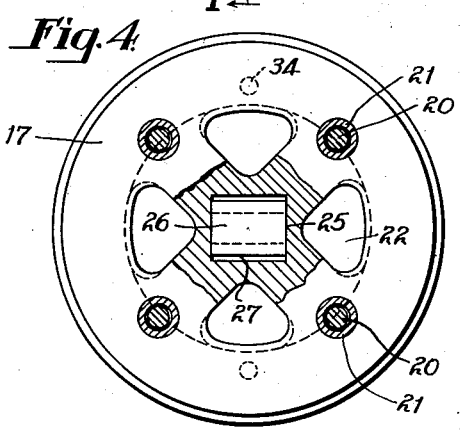
Fig. 4 represents a view, in partial section, taken in the direction of the arrows IV—IV on Fig. 1.
Figures 5, 6:
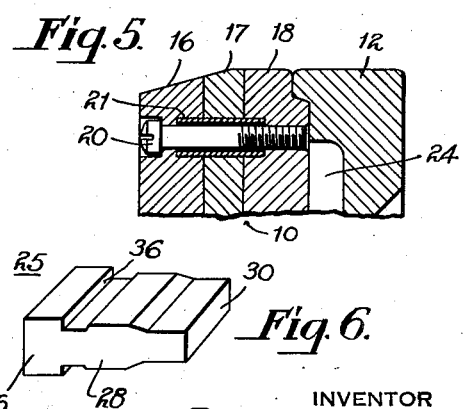
Fig. 5 represents a fragmentary sectional view taken along the line V—V of Fig. 2.
Fig. 6 represents a perspective view of the mandrel element removed from its supporting die structure.

Referring to the drawing, which has been selected for purposes of illustrating a porthole type extrusion die assembly embodying the principles of the present invention, it will be seen that the general type of extrusion assembly best adapted to a realization of the features and advantages of the present invention comprises a front mandrel or male die member, identified in its entirety by the reference numeral 10, and a back female or exterior contour-controlling die member 12. As is typical of this type of extrusion die assembly, the front die 10 is adapted to be aligned with a billet cylinder 14, a suitable chamfered seal between the front die and billet cylinder being normally employed to insure alignment of the extrusion tools with the cylinder 14 and a ram 15, the latter being provided for the purpose of exerting the necessary pressure for extruding a billet (not shown) through the extrusion die.

On reference to Fig. 1, it will be seen that the front or male die 10 is of laminar construction, three laminae having been selected for purposes of illustration. In its specific construction the die 10 is composed of three laminae 16, 17, and 18 of plate-like form arranged coaxially in face-to-face relation and suitably secured to form a unitary laminated block structure. In its preferred construction, cap screws 20, extending through sleeves 21, accurately align and secure the laminae in rigid assembled relationship.

Portholes or metal-flow passages 22 normally extend through the entire depth of the male die 10, and on assembly of the dies 10 and 12, passages 22 terminate in a mixing, welding or coalescing chamber 24 preferably formed in the female die 12.

A mandrel member 25 is supported and carried by the male die 10. In its preferred construction the mandrel 25 is provided with an enlarged head 26 which is adapted to be received within a cavity 27 formed in the intermediate laminar section 17. The mandrel 25, as illustrated in the drawing, is substantially T-shaped, the head 26 being substantially rectangular in form, as is the shank 28, which extends through a suitable aperture in laminar section 18.

The unsupported end 30 of the mandrel 25 is suitably formed, as by a machining operation, to represent the desired interior contour of the tubular extruded shape to be produced. This end portion 30 extends into a die aperture 32 in the female die 12, the mandrel tip 30 and die aperture 32 cooperating to form a die orifice of the exact cross-section of the extruded shape to be fabricated.

In the adaptation and operation of the extrusion tools of this invention, a mandrel of desired configuration is inserted through the aperture provided in lamina 18 in such a manner that the shoulder 36 formed at the jointure of head 26 and shank 28 prevents movement of the mandrel 25 through this section of the die structure. Laminar section 17 is thereafter placed in abutting relationship with section 18 with its aperture 27 in registry with the mandrel head 26. Sleeves 21 are then placed within aligned apertures disposed in sections 17 and 18, and laminar section 16 is thereafter positioned in abutting relationship with section 17, whereby complementary apertures in the section 16 register with the sleeves 21. The cap screws 20 are now inserted through the sleeves 21 whereby the three laminae 16, 17, and 18 are secured in the form of a unitary die structure. Assembly of die member 10, as here described, also serves to align the metal-flow passages 22, which extend through the three laminar sections of the die. Although four passages 22 have been illustrated, it will be apparent that any suitable number of passages may be employed, the number depending entirely upon the particular shape to be extruded and the equalization and distribution of pressure in the extrusion die as a result of the size and cross-sectional area of the shape to be extruded.

The front or male die 10 having been assembled as aforedescribed, it is now necessary to properly register this die with its cooperating female die 12. This is normally accomplished through the medium of dowel pins 34 which are preferably secured in the female die 12 in registry with apertures in laminar section 18 of male die 10. An assembled die structure, preferably in axial alignment and cooperation with the billet cylinder 14 and ram 15, may now be employed to perform an extrusion operation, whereby the metal or material of a billet charged within cylinder 14 may be forced through the assembled porthole extrusion die. It will be apparent that it will be necessary to provide those known elements of an extrusion mechanism necessary for maintaining dies 10 and 12 in pressure-resistant relationship with respect to the extrusion pressure employed during an extrusion operation.

The individual laminae of male die 10 permit selection of materials from which the same may be constructed to obtain maximum resistance to bending stresses developed during the use of the die assembly of this invention. For example, each laminar section may comprise the same, or an entirely distinctive material; and further, each may be separately heat-treated to develop predetermined physical properties therein. The same remarks apply with respect to the mandrel 25, and by proper selection of the materials from which the laminae 16, 17, and 18 are constructed, and by employing a separate mandrel 25, it will be manifest that, through proper heat-treatment of these various elements, a front mandrel type porthole extrusion die may be constructed which will provide optimum strength and physical properties in direct resistance to the forces exerted on a die of this type during an extrusion operation. Manifestly, any one portion or lamina of the die 10 may be thermally treated without in any way influencing the particular treatment required for an adjacent portion of the die, including the mandrel 25. It will be further understood that the laminar structure, even where all of the laminations are composed of the same material, permits development of heat-treated properties which could not be obtained in the heat-treatment of a solid die member of the same material.

A further advantage attributable to the laminar construction incorporated in the die 10 of this invention lies in the fact that the machining operations necessary in the production of the die have been greatly simplified. For example, each lamina may be separately machined and thereafter assembled in proper registry with its adjacent and coperating lamina. The sectional laminar construction further permits the substitution of various types of mandrels without the necessity of constructing an entirely new male die member. It is also inherent in laminar die structures of the type herein described, to select the materials from which the individual laminae and mandrel are constructed in relation to their heat transfer characteristics, whereby the laminae and mandrel may be assembled to best advantage to relieve localized heating within the die structures of this invention.

Although a specific die structure has been selected for purposes of illustrating and describing the present invention, it is to be understood that the specific embodiment hereinabove illustrated and described is not to be interpreted as limiting the scope of the present invention, except as defined in the claims appended hereto.

What is claimed is:

1. An extrusion tool assembly comprising a front die member and a back die member, said front die member comprising a plurality of laminar sections arranged in parallel abutting relationship, at least one metal-flow passage through said front die, a mandrel replaceably supported within the laminar sections, removable means for securing the laminar sections and mandrel in rigid assembled relationship, an aperture in said back die, said front and back dies being assembled to present the mandrel in cooperative relationship with the die aperture to define a die orifice therebetween, and said laminar sections being selected and disposed in predetermined relationship to present definite physical properties in resistance to bending stresses developed in the extrusion tool assembly during its use.

2. In a porthole type extrusion die, a front die member composed of a plurality of laminae arranged in abutting relationship, a T-shaped mandrel member associated with said front die member, said mandrel being disposed with its shank extending outwardly through an aperture in one lamina, the head of said mandrel being retentively disposed in a cavity in an adjacent lamina, and said mandrel and laminae being selected from materials having physical properties proportionate to the stresses developed in the die structure during its use.

3. In a porthole type extrusion die, a front die member composed of a plurality of laminae arranged in parallel abutting relationship, a plurality of sets of apertures extending through said laminae, each set of apertures being in registration, sleeves within said registered apertures, headed bolts extending through said sleeves in threaded engagement with an extreme end lamina, the heads of said bolts being in clamping relationship with the other end lamina, at least one metal-flow passage extending through said laminae, and a mandrel having a portion extending forwardly of an end lamina and another portion extending into the laminated structure where it is positively and replaceably secured.

4. In a porthole type extrusion die for the extrusion of unpierced billets, a front die therefor comprising a plurality of plate-like laminations of substantially identical form assembled in coaxial, face-to-face abutting relation, means carried by said laminations for clamping them in said relationship to form a unitary structure, a metal flow passage through said unitary structure formed by aligned openings in said laminae, and a mandrel of rectangular cross section disposed within and supported by said assembled laminations and extending only at one end past the rear face thereof to form a male die defining the interior configuration of a shape to be extruded when said front die is associated with a back die, said mandrel being removable for replacement upon disassembly of said laminations.

5. In a porthole type extrusion die for the extrusion of unpierced billets, a front die therefor comprising a plurality of plate-like laminations of substantially identical form assembled in coaxial, face-to-face abutting relation, means for clamping said laminations in said relationship to form a unitary structure, a metal flow passage through said unitary structure formed by aligned openings in said laminae, and a headed mandrel disposed entirely within and rigidly supported by said assembled laminations and having a shank portion extending rearwardly past the rear face thereof to form a male die defining the interior configuration of a shape to be extruded when said front die is associated with a back die, said laminations being constructed from materials of predetermined physical properties and positioned in said unitary structure to provide increased resistance to bending stresses developed in said structure during its use without increasing the thickness of said laminations.

BENJAMIN C. McFADDEN.